(12) United States Patent
Patzold

(10) Patent No.: US 9,677,665 B2
(45) Date of Patent: Jun. 13, 2017

(54) GEARSHIFTING DEVICE FOR A TRANSMISSION

(71) Applicant: ECS Engineered Control Systems AG, St. Gallen (CH)

(72) Inventor: Wolfgang Patzold, Northeim (DE)

(73) Assignee: ESC Engineered Control Systems AG, St. Gallen (CH)

( * ) Notice: Subject to any disclaimer, the term of this patent is extended or adjusted under 35 U.S.C. 154(b) by 0 days.

(21) Appl. No.: 15/086,659

(22) Filed: Mar. 31, 2016

(65) Prior Publication Data
US 2016/0208909 A1 Jul. 21, 2016

Related U.S. Application Data

(63) Continuation of application No. 14/147,650, filed on Jan. 6, 2014, now abandoned, which is a continuation
(Continued)

(51) Int. Cl.
| | | |
|---|---|---|
| *F16H 59/02* | (2006.01) | |
| *F16H 61/22* | (2006.01) | |
| *F16H 59/10* | (2006.01) | |

(52) U.S. Cl.
CPC ......... *F16H 59/0204* (2013.01); *F16H 59/10* (2013.01); *F16H 61/22* (2013.01);
(Continued)

(58) Field of Classification Search
CPC ...... F16H 59/10; F16H 59/0204; F16H 61/22; F16H 2059/0239
(Continued)

(56) References Cited

U.S. PATENT DOCUMENTS

| | | |
|---|---|---|
| 5,509,322 A | 4/1996 | Anderson et al. |
| 5,689,996 A | 11/1997 | Ersoy |

(Continued)

FOREIGN PATENT DOCUMENTS

| | | |
|---|---|---|
| DE | 59804279 T2 | 7/2002 |
| DE | 10249074 A1 | 5/2004 |

(Continued)

OTHER PUBLICATIONS

Office Action issued Jan. 6, 2016 in U.S. Appl. No. 14/147,650 by Pätzold.
(Continued)

*Primary Examiner* — William Kelleher
*Assistant Examiner* — Gregory Prather
(74) *Attorney, Agent, or Firm* — Rogowski Law LLC

(57) ABSTRACT

The invention relates to a gearshifting device (1), which is intended for a transmission and comprises a selector lever (2) that can be moved in such a manner that different shift positions (P, R, N, D, S, M+, M−) can be selected in at least two gearshift gates (3, 4) and that it is possible to shift between one of the gearshift gates (3, 4) and the at least one other gearshift gate (4, 3), and comprises at least one lock (5), which is used to block the traversing path of the selector lever (2) with respect to one of the gearshift gates (3, 4), in order to shift from one of the shift positions (P, R, N, D, S) into another of the shift positions (P, R, N, D, S). According to the invention, at least one locking element (10) is provided, which is mechanically coupled to the selector lever (2) and by means of which the shift lock (5) can be activated and/or deactivated in that with respect to the gearshift gate (3) that is to be blocked, the locking element (10) can be moved into and out of the traversing path of the selector lever (2).

10 Claims, 11 Drawing Sheets

Related U.S. Application Data of application No. 12/743,263, filed as application No. PCT/EP2009/004382 on Jun. 18, 2009, now Pat. No. 8,863,603.

(52) U.S. Cl.
CPC ... *F16H 2059/0239* (2013.01); *Y10T 74/2011* (2015.01); *Y10T 74/20104* (2015.01); *Y10T 74/20159* (2015.01)

(58) Field of Classification Search
USPC ... 74/473.1, 473.21, 473.23, 473.24, 473.25, 74/473.3, 473.22
See application file for complete search history.

(56) References Cited

U.S. PATENT DOCUMENTS

| | | |
|---|---|---|
| 5,768,944 A | 6/1998 | Inuzuka et al. |
| 5,791,197 A | 8/1998 | Rempinski et al. |
| 5,899,115 A | 5/1999 | Kataumi et al. |
| 6,148,686 A | 11/2000 | Kataumi |
| 6,230,579 B1 | 5/2001 | Reasoner et al. |
| 6,295,886 B1 | 10/2001 | Russell |
| 6,923,084 B2 | 8/2005 | Kramer et al. |
| 7,028,575 B2 | 4/2006 | Ehrmaier et al. |
| 7,114,410 B2 | 10/2006 | Nagasawa |
| 7,117,760 B2 | 10/2006 | Kramer et al. |
| 7,210,370 B2 | 5/2007 | Giefer et |
| 8,347,752 B2 | 1/2013 | Weifels |
| 8,371,188 B2 | 2/2013 | Bortolon et al. |

FOREIGN PATENT DOCUMENTS

| | | |
|---|---|---|
| EP | 0899478 A1 | 3/1999 |
| JP | 2005119440 A | 5/2005 |

OTHER PUBLICATIONS

Office Action issued Aug. 13, 2015 in U.S. Appl. No. 14/147,650 by Pätzold.

GEARSHIFTING DEVICE FOR A TRANSMISSION

CROSS-REFERENCE TO RELATED APPLICATIONS

This application is a continuation of U.S. Ser. No. 14/147,650, filed Jan. 6, 2014, pending, which is a continuation of U.S. Ser. No. 12/743,263, filed May 17, 2010, issued as U.S. Pat. No. 8,863,603, which is a national stage application (under 35 U.S.C. §371) of PCT/EP2009/004382, filed Jun. 18, 2009, which claims benefit of German application 10 2008 028 619.2, filed Jun. 18, 2008.

TECHNICAL FIELD

The invention relates to a gearshifting device that is intended for a transmission and comprises a selector lever, which can be moved in such a way that different shift positions can be selected in at least two gearshift gates and that it is possible to shift between one of the gearshift gates and the at least one other gearshift gate. The gearshifting device also comprises at least one lock, which is used to block the traversing path of the selector lever in one of the shift gates, in order to shift from one of the shift positions into another of the shift positions. Furthermore, the invention relates to a transmission, in particular an automatic transmission, equipped with such a gearshifting device.

BACKGROUND ART

A gearshifting device of the aforementioned kind is known from DE 102 49 074 A1 and serves to shift an automatic transmission, which exhibits an additional manual shift function. The gearshifting device allows various automatically shiftable drive positions, such as "P," "R," "N," "D," to be preselected by pivoting a selector lever into a first gearshift gate. The selector lever can be shifted by way of the cross gate from the first gearshift gate into a second gearshift gate, in which the individual, manually shiftable gears can be preselected. The manually shiftable gears in the second gearshift gate are shifted by pivoting the selector lever in two opposite directions—for example, in the direction of travel and in the direction opposite the direction of travel. This action takes place by just tapping the selector lever, which induces a so-called plus sensor and minus sensor to respond and they in turn initiate an upshift or downshift of the manual transmission gears.

For safety reasons the gearshifting device prevents a shift between certain drive positions in the first gearshift gate by means of a lock, which can be overcome by activating an activating element. This shift lock is not desired in the second gearshift gate, which provides the additional manual gearshift function, because it is precisely in the second gearshift gate that a slight tap or pivoting of the selector lever is supposed to initiate the upshift or downshift of the manual gear speeds.

In order to prevent the selector lever from moving freely in the first gearshift gate with the automatic shiftable drive positions, but at the same time to make it possible to move the selector lever freely in the second gearshift gate, the gearshifting device has an intermediate piece, which is supported relative to the housing in the first gearshift gate and forms a stop for the selector lever. The intermediate piece is disposed on a connecting link, on which the selector lever is mounted in a pivotable manner. On shifting from the first gearshift gate into the second gearshift gate, the selector lever is pivoted together with the connecting link. In this way the intermediate piece in the gearshifting device would also form a lock for the selector lever even in the second gearshift gate. In order to prevent such a lock, the intermediate piece is mounted in a moveable manner on the connecting link; and the housing is displaced in such a manner that the selector lever can be moved freely in the direction of the second gearshift gate far enough that the manual gears can be shifted up or down. At the same time the intermediate piece is moved outwards by the selector lever. In order to guarantee that the intermediate piece will return again into its starting position, a spring element is provided.

Therefore, the gearshifting device employs relatively complicated technical measures to block the traversing path of the selector lever in the first gearshift gate and to be able to move the selector lever freely in the second gearshift gate.

Another gearshifting device equipped with an automatic transmission mode and additional manual transmission mode is known from EP 0 899 478 A1. The gearshifting device exhibits a shift lock, which for safety reasons prevents the selector lever of the gearshifting device from being shifted from one shift position into another shift position inside the gearshift gate. To this end the selector lever has a positioning bolt, which moves with the selector lever and strikes against the shift lock when the selector lever is moved in an attempt to shift. This shift lock is formed by a stop, which is configured on a side wall of the housing of the gearshifting device. For this purpose the side wall has a passage opening, of which the upper rim forms the stop. The profile of the opening rim is designed in such a manner that additional stops, forming the shift locks, are produced along the traversing path of the selector lever.

The gearshifting device has two such side walls with the selector lever situated between the side walls. In the selector lever's vertical starting position, in which the selector lever is located in the gearshift gate for the automatic transmission mode, the positioning bolt, which is coupled to the selector lever, is horizontally oriented and engages with each of its two ends in the opening of the side walls. In this position of the positioning bolt, the traversing path of the selector lever inside the gearshift gate for the automatic transmission mode is limited by at least one of the stops on the opening rim. If the selector lever is pivoted from the gearshift gate for the automatic transmission mode into the gearshift gate for the manual transmission mode, then the positioning bolt moves into an inclined position as a function of the pivot movement of the selector lever. In this position the positioning bolt engages with only its one end in the opening of the one side wall and with its other end has left the position of engagement with respect to the opening of the other side wall. In addition, the gearshifting device provides a relatively complex mechanism that is used to move the positioning bolt downwards in a straight line when the selector lever is pivoted. As a result, the positioning bolt with its end engaging in the one opening is moved downwards far enough that the pivot movement of the selector lever in the gearshift gate for the manual transmission mode is no longer limited by the one shift lock and, hence, the shift lock is deactivated. However, the pivot movement of the selector lever is limited by a shift lock that is located farther away.

In summary the gearshifting device resorts to relatively complicated strategies in order to provide, on deactivation of the shift lock, a traversing path for the selector lever that is adequate enough to impart to the driver of the vehicle a comfortable operating feeling.

Therefore, it would be desirable to have a gearshifting device for a transmission that exhibits a shift lock that can be activated and deactivated in a technically simple manner. Furthermore, when the shift lock is deactivated, the selector lever of the gearshifting device should be moveable over a traversing path that is sufficiently long to give a comfortable gearshifting feeling.

SUMMARY OF THE INVENTION

The gearshifting device, according to one embodiment of the invention, exhibits a selector lever that can be moved in such a manner that different shift positions of the transmission can be selected in at least two gearshift gates and that it is possible to shift between one of the gearshift gates and the at least one other gearshift gate. Furthermore, the gearshifting device exhibits at least one lock, which can prevent the selector lever from being shifted from one of the shift positions into another of the shift positions inside at least one of the gearshift gates by locking the traversing path of the selector lever in at least one gearshift gate.

The embodiment of the invention provides at least one locking element, which is mechanically coupled to the selector lever and by means of which the shift lock can be activated and/or deactivated, in that with respect to the gearshift gate that is to be blocked, the locking element can be moved into and/or out of the traversing path of the selector lever.

This procedure makes it possible to achieve in a technically simple manner an activation and/or deactivation of the shift lock in that for this purpose the invention provides only one single component. Similarly it is possible to dispense with additional components, such as reset springs, and also with manufacturing-intensive component structures, such as sliding surfaces, which are to be provided for the procedure of the intermediate piece on the gate in the gearshifting device according to DE 102 49 074 A1. Moreover, the traversing path of the selector lever is not limited in a technically simple way, when the shift lock is deactivated, because then the locking element is moved out of the traversing path of the locking element. Hence, the inventive approach makes it possible to prevent a shift from one shift position into another shift position of a gearshift gate in that the shift lock in this gearshift gate is activated, but at the same time the selector lever is allowed to move freely into one of the other gearshift gates by deactivating the shift lock.

A first embodiment of the invention provides that with respect to the gearshift gate that is to be blocked, the locking element can be moved essentially from the top into the traversing path of the selector lever in order to activate the shift lock. This measure is technically especially easy to implement, since the gearshifting device is usually mounted with its bottom part on the body floor of a vehicle and, therefore, coming from below, relatively little design space is available. Furthermore, a locking element, which can be moved in this way, is relatively simple and easy to access from the outside. Therefore, in order to deactivate the shift lock, it should be possible to move the locking element in essence upwards out of the traversing path of the selector lever.

Another embodiment of the invention provides that the locking element and the selector lever are coupled mechanically together in such a way that when the selector lever is moved between the gearshift gates, the locking element is moved into its shift lock activating position or into its shift lock deactivating position. As a result, just the movement of the selector lever alone brings about the activation or deactivation of the shift lock.

An additional embodiment of the invention provides that the locking element can be lifted in the axial direction of the selector lever, in order to move the selector lever from the one shift position into another shift position of the one gearshift gate, in particular the blocked gearshift gate. By moving the locking element upwards it is possible to overcome the shift lock in a technically simple way. In this way a mechanism is achieved that makes it possible to shift permanently and reliably from one shift position into another shift position of a gearshift gate, during which the shift lock can be overcome by the operator of the selector lever.

Yet another embodiment of the invention provides that the locking element can be pivoted into its shift lock activating position. At the same time it should be possible to pivot the locking element and the selector lever together about a first axis of rotation. This approach makes possible a defined movement of the selector lever and also of the locking element in an especially simple way in that a pivot movement takes place about the first axis of rotation. As a result, the locking element can be moved into and out of the pivot path of the selector lever.

It is expedient that when shift lock is activated, the locking element engages with at least one section between the shift lock and a driving lug that interacts with the selector lever.

At the same time it may be provided that in the selected shift position the shift lock and the contour of the driving lug form a receptacle for the section of the locking element. In this way the locking element can occupy the locking position—thus, dip into the receptacle without rendering the movement of the locking element difficult by, for example, tilting or the like. Hence, the receptacle shows that a suitable design measure has already been initiated, in order to be able to hold the locking element reliably.

An additional embodiment of the invention provides that the driving lug can be moved axially in relation to the selector lever. As a result, the shift lock can be overcome by lifting and/or moving upwards, in particular, the driving lug. In this raised position the shift lock, which is configured, for example, as a ramp, can be overcome without any problem, and the selector lever can be moved further in the direction of the next shift position.

In this respect it is expedient for the driving lug to exhibit a passage opening, through which the selector lever extends. As a result, any movement of the selector lever is transmitted by the driving lug, because with every movement transversely to its longitudinal axis, the selector lever can take along the driving lug.

An advantageous embodiment of the invention provides that the driving lug exhibits an oblong hole, through which the selector lever extends. As a result, the selector lever is freely moveable inside the longitudinal stretch of the oblong hole without transferring the movement of the selector lever in this direction by the driving lug. Owing to the oblong hole the selector lever can be moved, for example, from one gearshift gate to another gearshift gate by way of a cross gate.

The oblong hole of the driving lug should extend preferably to the right and the left of a gearshift gate. As a result, it is possible to arrange the other gearshift gate either on the right or the left of the one gearshift gate. Hence, the gearshifting device is suitable for use in vehicles equipped with a right hand drive as well as in vehicles equipped with a left hand drive, because in each case the other gearshift gate can be arranged either on the left or the right of the one gearshift gate. Naturally the oblong hole also offers the possibility of providing three gearshift gates—that is, one gearshift gate, which extends centrally from the oblong hole, and a respective other gearshift gate, which extends laterally from the oblong hole on the left and right thereto.

A preferred embodiment of the invention provides a sliding block guide, which in the course of shifting between the gearshift gates converts the movement of the selector lever into a movement of the locking element in order to activate or deactivate the shift lock. This sliding block guide makes it possible to convert from one kind of movement into another kind of movement in a technically simple way.

In this case it is expedient for the selector lever to be pivotable about a first axis of rotation and for the sliding block guide to convert the pivot movement of the selector lever into a linear movement of the locking element and in this way to be moveable into and out of the pivot path of the selector lever. As a result, a technically disadvantageous inclined position of the locking element is avoided. Furthermore, owing to the linear movement the locking element is easily guidable.

A preferred embodiment of the invention provides that the sliding block guide is formed by at least one essentially vertical guide face of a guide member, which can be moved with the selector lever in the direction of the gearshift gates, and a guide face of the locking element that is arranged obliquely to said guide member. In this case the locking element can be moved vertically on the guide face of the guide member; and a piece that transfers the pivot movement of the selector lever engages with the inclined guide face of the locking element. As a result, a conversion of the pivot movement of the selector lever into a linear movement of the locking element in the vertical direction is certainly possible, thus eliminating the possibility of the guide faces causing the locking element to tilt or tip while moving in the vertical direction.

It is expedient for the transfer piece to have an opposing surface section that in essence corresponds with the inclined guide face of the locking element. The result is a planar engagement of the transfer piece with the locking element, thus reducing any wear symptoms in the areas that move into an acting position owing to the wide area engagement.

Preferably the opposing surface section of the transfer piece should be configured so as to bulge outwards. As a result, it is possible to improve the slip of the opposing surface section of the transfer piece on the inclined surface section of the locking element during the pivot movement of the selector lever, because a tilting is counteracted owing to the curvature of the opposing surface section.

An advantageous embodiment of the invention provides that the transfer piece is connected securely to the selector lever. As a result, an optimal force transfer and/or movement transfer from the selector lever to the transfer piece is made possible.

The transfer piece should be molded preferably on the selector lever. As a result, an especially simple production of the transfer piece is made possible, especially if the transfer piece is molded or rather injection molded on a plastic shell of the selector lever.

As an alternative it can also be provided that the transfer piece can be moved horizontally relative to a housing section of the gearshifting device. As a result, it is guaranteed that the transfer piece itself does not tilt and/or tip during the pivot movement of the selector lever, a state that would no longer guarantee that the transfer piece will slide optimally in relation to the inclined guide face of the locking element.

A further development of the invention provides that the guide member exhibits at least two vertical guide faces, which are rigidly mounted in the housing and between which the locking element can be moved vertically. As a result, the locking element can be guided very well during its linear movement in the vertical direction, thus eliminating any operating faults of the gearshifting device in the course of deactivating the shift lock.

An additional embodiment of the invention provides that the locking element exhibits two inclined guide faces that have the purpose of pivoting the selector lever to the left and to the right with respect to a vertical starting position and that are arranged so as to be mirror-symmetrical to each other in relation to the center axis of the locking element. As a result, the locking element is suited for use in gearshifting devices both in right hand drive vehicles and also in left hand drive vehicles. Thus, the locking element can be used in gearshifting devices that can be moved to the left or to the right, starting from a vertical starting position of the selector lever.

The transfer piece is also suited for use in gearshifting devices in both left hand and right hand drive vehicles, if, according to a preferred embodiment of the invention, the transfer piece exhibits two opposing surface sections that correspond with the inclined guide face of the locking element and that are arranged so as to be mirror-symmetrical to one another in relation to the center axis of the transfer piece.

Another embodiment of the invention provides a connecting element, which is coupled to a traction mechanism of the selector lever and has the purpose of lifting the locking element. This connecting element engages in an opening, passage or depression or such material recess of the locking element. As a result, it is possible to achieve that the locking element is lifted in an especially simple way that is especially comfortable for the operator of the selector lever to carry out.

It is expedient for the material recess to exhibit both a wall section, which makes active contact with the connecting element, and also an outlet area, inside of which the connecting element moves when the selector lever pivots from the one gearshift gate into the other gearshift gate. As a result, irrespective of the mechanism that is achieved for lifting the locking element, the locking element makes possible a flawless activation and/or deactivation of the shift lock, because the movement of the connecting element can take place in an unimpeded manner inside the outlet area in the course of moving the selector lever between the gearshift gates. In contrast, the locking element is lifted over the wall section, with which the connecting element engages during the lifting procedure.

Furthermore, it is expedient for the at least one shift lock to be rigidly mounted in the housing. This design of the shift lock on the housing, preferably on the housing of the gearshifting device, makes it possible to achieve a stable and high stress absorbing shift lock.

It is possible to provide several shift locks, which are assigned to at least one gearshift gate. As a result, all or a portion of the shift positions of the one gearshift gate can be assigned to such a shift lock, so that the selector lever that is in this shift position cannot be moved into another shift position until the assigned shift lock has been overcome.

An advantageous embodiment of the invention provides that the gearshift gate, which interacts with the shift lock, exhibits different automatically shiftable shift positions. As a result, the gearshifting device is especially suited for use with an automatic transmission.

An additional advantageous embodiment of the invention consists of the individual, manually shiftable gears being selectable in at least one of the other gearshift gates. As a result, the gearshifting device is also suited for automatic transmissions with an additional manual shift function.

The movement of the selector lever in the respective gearshift gates and also the shifting of the selector lever between the gearshift gates can be achieved in an especially simple way, if, according to an advantageous embodiment of the invention, the selector lever can be pivoted about a first axis of rotation for movement in the direction of the gearshift gate and about a second axis of rotation for movement between the gearshift gates.

The gearshifting device, according to the invention, is provided preferably for use in a transmission of a motor vehicle, in particular an automatic transmission.

DESCRIPTION OF THE DRAWINGS

Additional goals, advantages, features and applications of the present invention are disclosed in the following description of two embodiments with reference to the drawings. At the same time all of the features that are described and/or depicted in the drawings form individually or in any logical combination the subject matter of the present invention, even independently of their summary in the claims or their references.

DETAILED DESCRIPTION OF EMBODIMENTS

Figure 1:
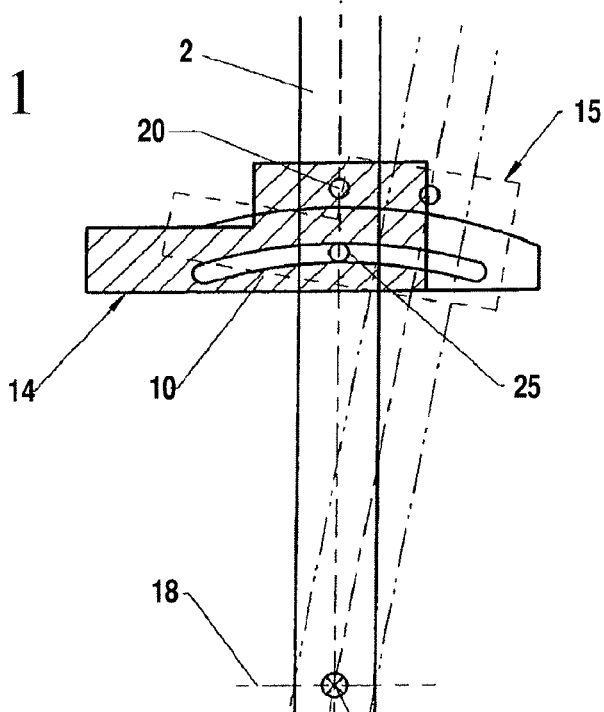
FIG. 1 is a schematic drawing of a top view of a possible embodiment of the gearshifting device for a transmission.
Figure 2:
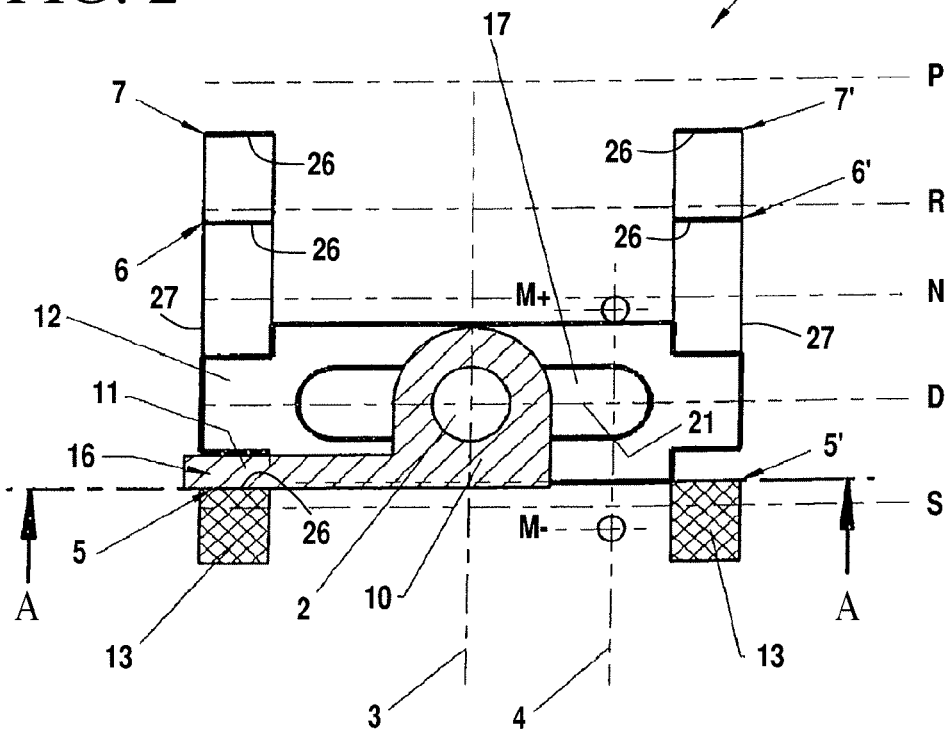
FIG. 2 shows a broken out section along the intersection line A-A in FIG. 1 of the gearshifting device according to FIG. 1.

FIGS. 1 and 2 are schematic drawings of a possible embodiment of a gearshifting device 1 for an automatic transmission with an additional manual shift function. At the same time the gearshifting device 1 combines the advantages of the shifting of a conventional automatic transmission with the advantages of a transmission to be shifted manually. In principle the gearshifting device 1 is also suited for use with a manual or automatic transmission.

The gearshifting device 1 exhibits a shift and/or selector lever 2, which can be moved into different positions by an operator. In this respect the shift and/or selector lever 2 can be moved in such a manner that in a first gearshift gate 3 different automatically shiftable drive positions, such as "P," "R," "N," "D," "S" and in a second gearshift gate 4 individual, manually shiftable gears can be selected, and shifting between a predetermined drive position of the first gearshift gate 3, preferably the drive position "D," and a neutral position "M" of the second gearshift gate 4 by way of a cross gearshift gate 21 is made possible. In this case an upshifting and/or downshifting of the manual gears, for example, first through fourth gear, is brought about in the second gearshift gate, starting from a neutral position "M" by pivoting the selector lever 2 into an "M+" position and an "M−" position. After pivoting or tapping the selector lever 2 into the "M+" position or the "M−" position, the selector lever 2 automatically returns preferably into the neutral starting position "M."

In order to shift the selector lever 2 from the first gearshift gate 3 into the second gearshift gate 4 and vice versa, the selector lever 2 is mounted in a rotatable manner about a first axis of rotation 19. In order to move the selector lever 2 in the direction of the respective gearshift gate 3 and/or 4, the selector lever 2 is mounted additionally in a pivotable manner about a second axis of rotation 18.

It is especially clear from FIG. 1 that a plurality of shift locks 5, 6, 7 are provided in the first gearshift gate 3 for the automatic mode. The shift locks 5, 6, 7 are formed by the housing 13 and/or a corresponding contour of the housing 13 of the gearshifting device 1. Preferably the shift locks 5, 6, 7 respectively are formed by a stop face 26 on an inwardly projecting projection 27 of the housing 13.

The shift locks 5, 6, 7 prevent further shifting from the respective drive position into another drive position. The shift locks 5, 6, 7 are overcome only if an actuating element (not illustrated here) is actuated.

The gearshifting device 1, according to FIGS. 1 and 2, provides that in the first gearshift gate 3 the shift lock 5 blocks a shifting of the selector lever 2 from the drive position "D" into the drive position "S." The shift lock 6 prevents further shifting of the selector lever 2 from the drive position "N" into the drive position "R." Furthermore, the shift lock 7 prevents the selector lever 2 from being shifted further from the drive position "R" into the drive position "P."

In this patent application the symbol "P" stands for the drive position "park"; "R," the drive position "reverse drive"; "N," the drive position "neutral"; "D," the drive position "drive"; and "S," the drive position "sporty driving."

In order to be able to shift the selector lever 2 from the drive position "D" of the first gearshift gate 3 into the neutral position "M" of the second gearshift gate 4, the gearshifting device 1 provides means for activating the shift lock 5 and means for its deactivation. If the selector lever 2 is in the drive position "D," then the shift lock 5 is activated by the means. If the selector lever 2 is pivoted via the cross gearshift gate 21 from the first gearshift gate 3 into the second gearshift gate 4, then the shift lock 5 is deactivated by the means. In the second gearshift gate 4 the selector lever 2 can be freely pivoted between the positions "M+" and "M−."

The means for activating and preferably also the means for deactivating the shift lock 5 are mechanically coupled to the selector lever 2, so that an activation and/or deactivation of the shift lock 5 is carried out simultaneously by the pivot movement of the selector lever 2.

In the gearshifting device 1, according to FIGS. 1 and 2, the means for activating and the means for deactivating the shift lock 5 are formed by a common component—that is, the locking element 10.

It is especially clear from FIG. 2 that the locking element 10 is moved into a locking position 14, if the selector lever 2 is in the first gearshift gate 3. In this locking position 14 the shift lock 5 is activated. In contrast, when the shift lock 5 is deactivated, the locking element 10 is moved into an unlocking position 15. Thus, the activation and/or deactivation of the shift lock 5 is achieved by the movement of the locking element 10, which is mechanically coupled to the selector lever 2, and which in relation to the shift gate 3 to be blocked can be moved into the traversing path of the selector lever 2 in order to activate the shift lock 5 and can be moved out of the traversing path of the selector lever 2 in order to deactivate the shift lock 5. In this case the locking element 10 is pivoted essentially from the top into the traversing path of the selector lever 2 and/or is pivoted essentially upwards out of the traversing path of the selector lever 2.

The selector lever 2 is an automatic shift lever of the kind known from the prior art and projects upwards in the installed state of the gearshifting device 1. The selector lever 2 is designed like a pipe and exhibits a pull rod 24. The pull rod 24 is forcibly guided in two directions in the selector lever 2 so that the pull rod 24 takes part in the pivot movements of the selector lever 2. However, the pull rod 24 can be moved in the axial direction in relation to the selector lever 2, preferably by means of the activating element (not illustrated here).

In the case of the gearshifting device 1 the locking element 10 is securely connected to the pull rod 24, for example, by means of at least one connecting pin 20, screw, threaded rod or the like. The locking element 10 can also be securely connected to the pull rod 24 by means of thermal joining methods, by adhesive cementing or the like. It is also possible to mold the locking element 10 on the pull rod 24. As a result, the locking element 10 participates in the pivot movements of the selector lever 2 and can be moved in the axial direction.

Preferably one section 23 of the locking element 10 is designed in the shape of a ring, through which the selector lever 2 extends. The selector lever 2 is guided in this section 23, when the pull rod 24 and/or the locking element 10 is moved in the axial direction in relation to the selector lever 2.

In the locking position 14—that is, when the shift lock 5 is activated—one section 11 of the locking element 10 engages between the shift lock 5 and the contour of a driving lug 12 and in this way causes the selector lever 2 to lock in the shift position "D" as compared to the shift position "S" in the first gearshift gate 3. At the same time the shift lock 5 and the contour of the driving lug 12 form a receptacle 16 for the section 11 of the locking element 10.

The driving lug 12 acts together with the selector lever 2 in such a manner that the driving lug 12 takes part in the movement of the selector lever 2 in the direction of the gearshift gate 3. In the locking position 14 the housing 13 forms the stop 26 for the locking element 10, which in turn forms a stop for the driving lug 12 and, thus, prevents the movement of the selector lever 2.

The driving lug 12 can be moved axially in relation to the selector lever 2, in particular so that it can be lifted together with the locking element 10 far enough that the shift locks 5, 6, 7 can be overcome. Preferably the driving lug 12 is securely connected to the pull rod 24, for example by means of a connecting element 25.

Preferably the driving lug 12 exhibits an oblong hole 17, through which the selector lever 2 extends. Preferably the selector lever 2 is oriented essentially in the middle of the oblong hole 17, when the selector lever 2 is in the first gearshift gate 3. On the left or the right thereto is arranged the selector lever 2 in the oblong hole 17, when the selector lever 2 is pivoted into the second gearshift gate 4.

The gearshifting device 1, according to FIGS. 1 and 2, has, besides the shift locks 5, 6, 7, additionally the shift locks 5', 6', 7', which are arranged at a distance from the shift locks 5, 6, 7. In this case the shift locks 5, 5', the shift locks 6, 6' and the shift locks 7, 7' act jointly on the respective drive position. Preferably the shift locks 5, 6, 7 and 5', 6', 7' are arranged in the area of the two ends 22 of the driving lug 12, so that together with the oblong hole 17 of the driving lug 12 the gearshifting device 1 can be retrofitted without any problem, insofar as the second shift gate 4 in relation to the shift gate 3 is on the other side of the cross shift gate 21. This is the case, for example, in so-called right hand drive vehicles, in which the steering wheel is disposed on the right side. For this purpose the selector lever 2, starting from the central position for the first shift gate 3, would have to be pivoted in the direction to the left, a feature that can be achieved owing to the oblong hole 17. To this end the only requirement is that the locking element 10 has to be suitably rotated, so that the section 11 of the locking element 10 is forced to engage with the other shift lock 5' and the other end of the driving lug 12.

Figure 3:
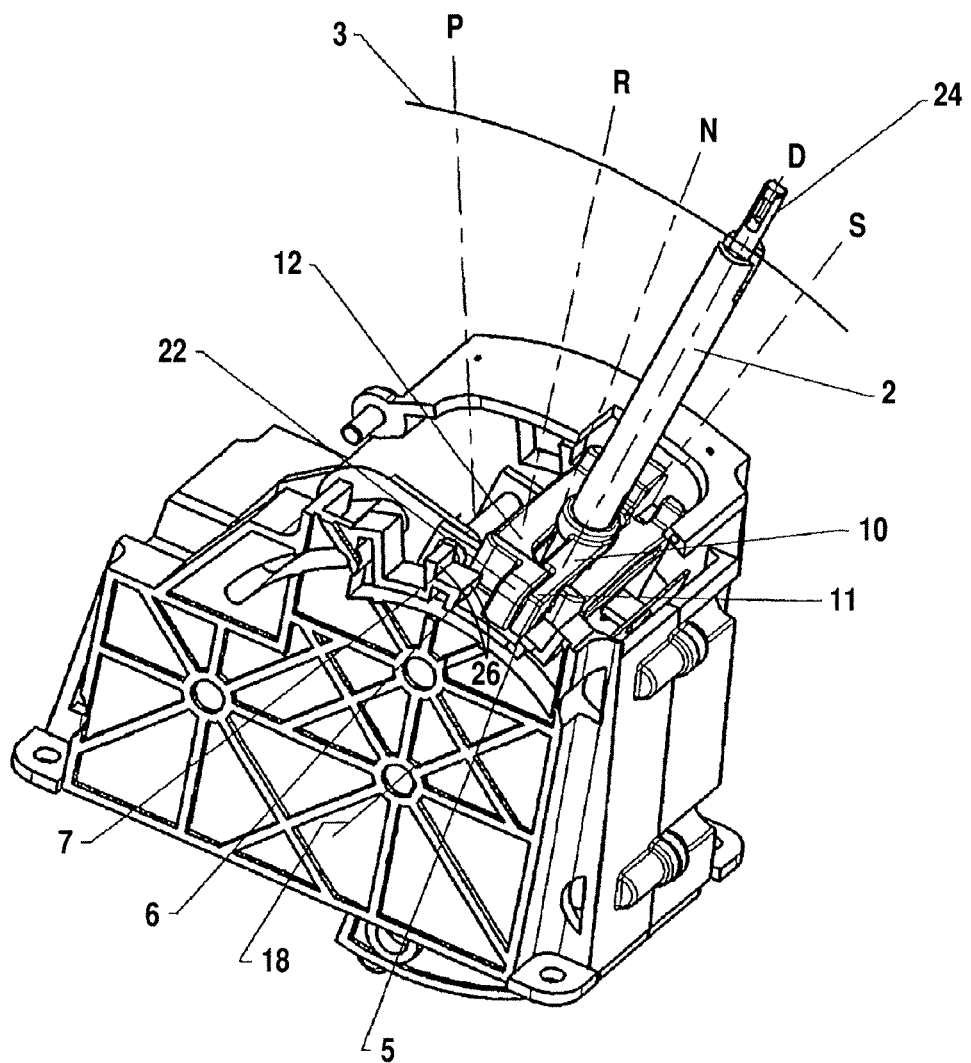
FIG. 3 is a perspective view of an embodiment of the gearshifting device with the selector lever in a first gearshift gate, installed in a housing.
Figure 4:
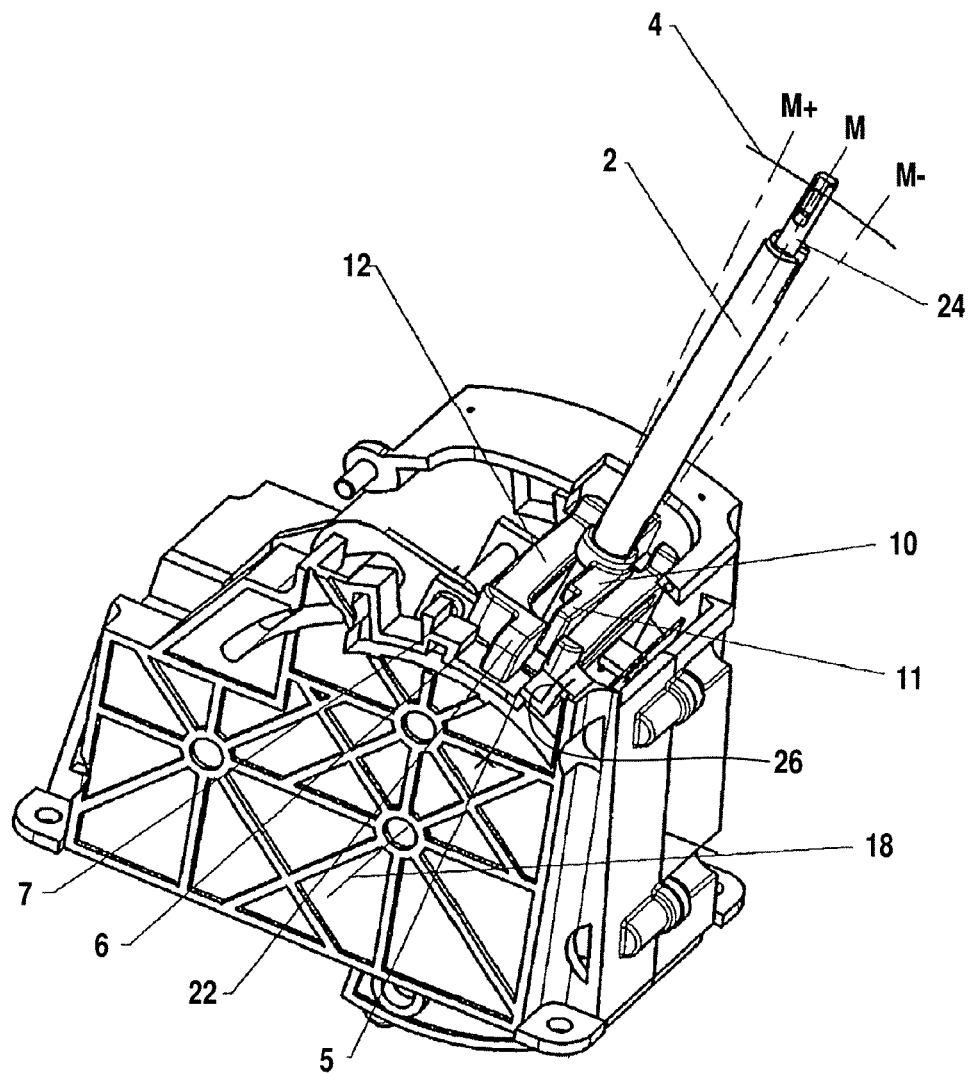
FIG. 4 is a perspective view of the gearshifting device, shown in FIG. 3, with the selector lever in a second gearshift gate.
Figure 5:
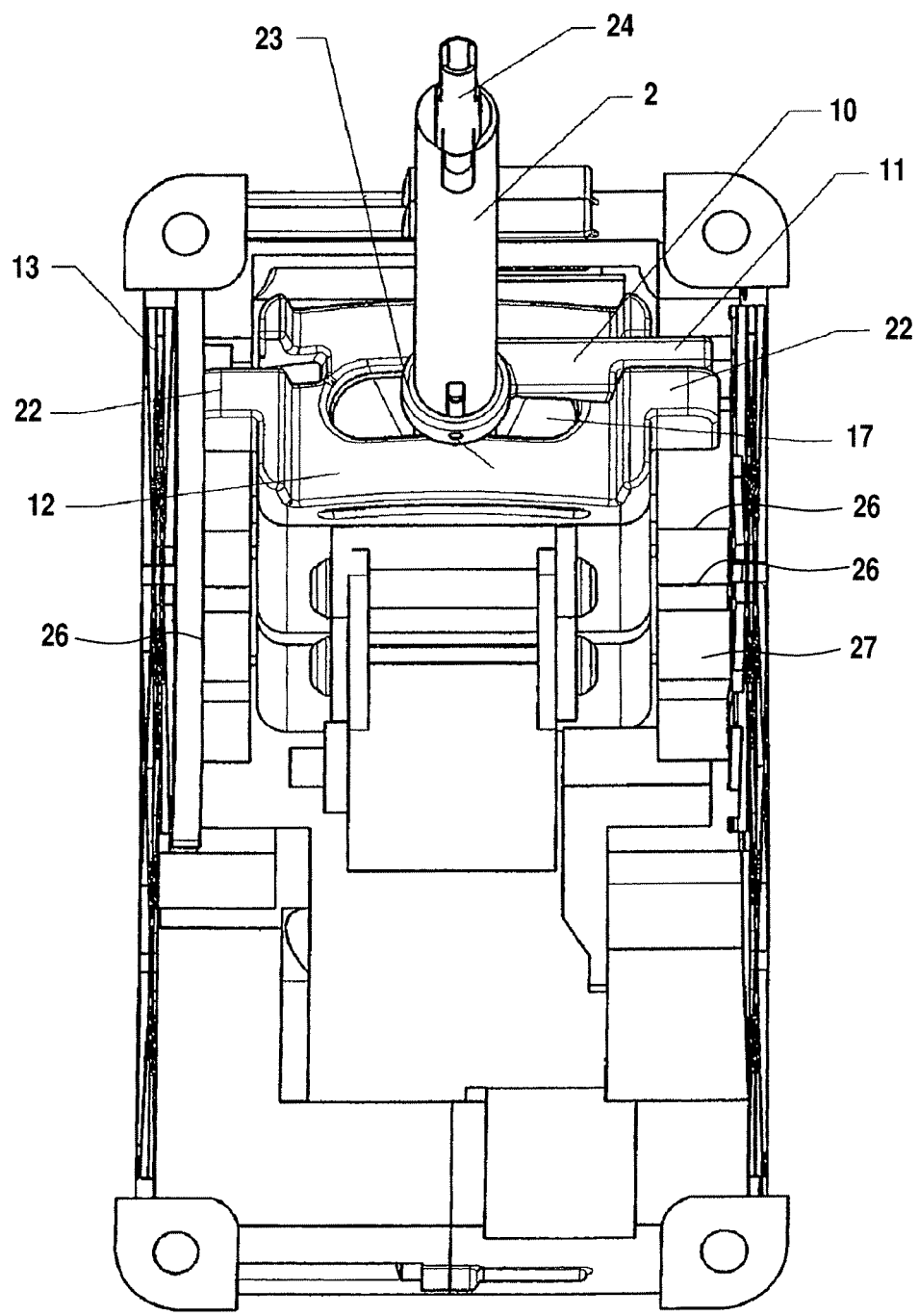
FIG. 5 is a top view of the gearshifting device, according to FIG. 3, with the selector lever in the first gearshift gate.
Figure 6:
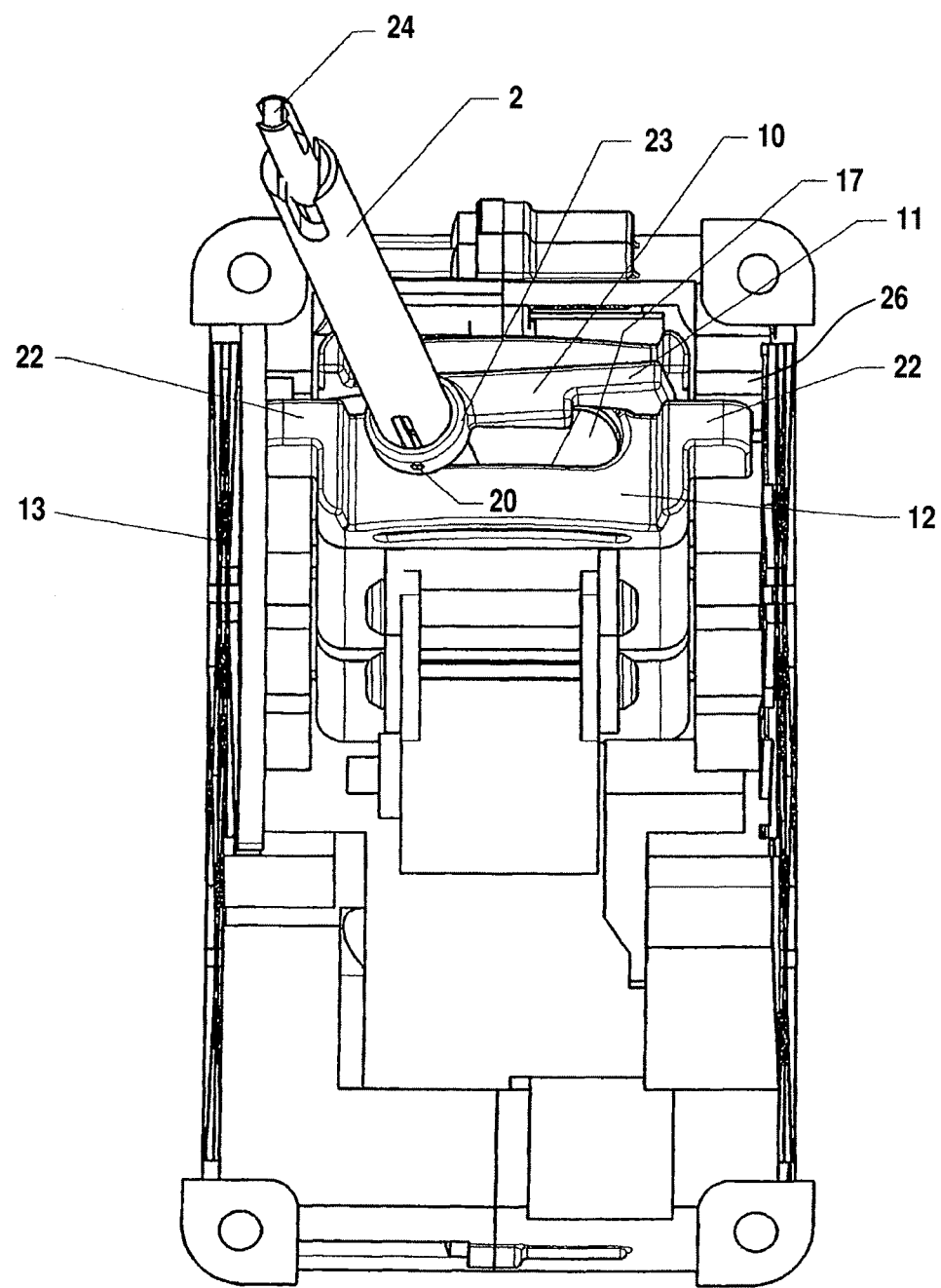
FIG. 6 is a top view of the gearshifting device, according to FIG. 4, with the selector lever in the second gearshift gate.
Figure 7:
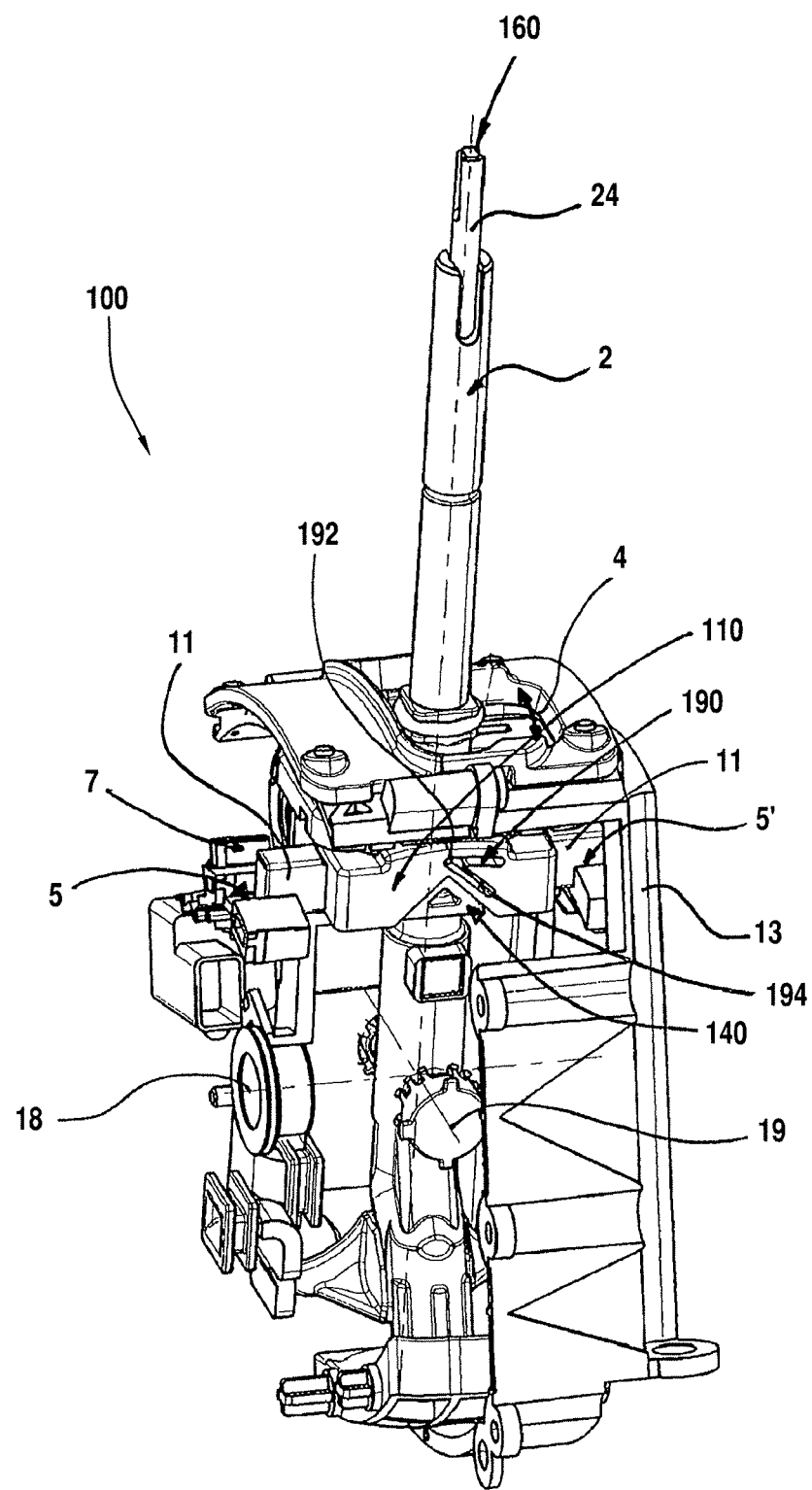
FIG. 7 is a sectional perspective view of a part of another possible embodiment of a gearshifting device for a transmission with a selector lever in a first gearshift gate.
Figure 8:
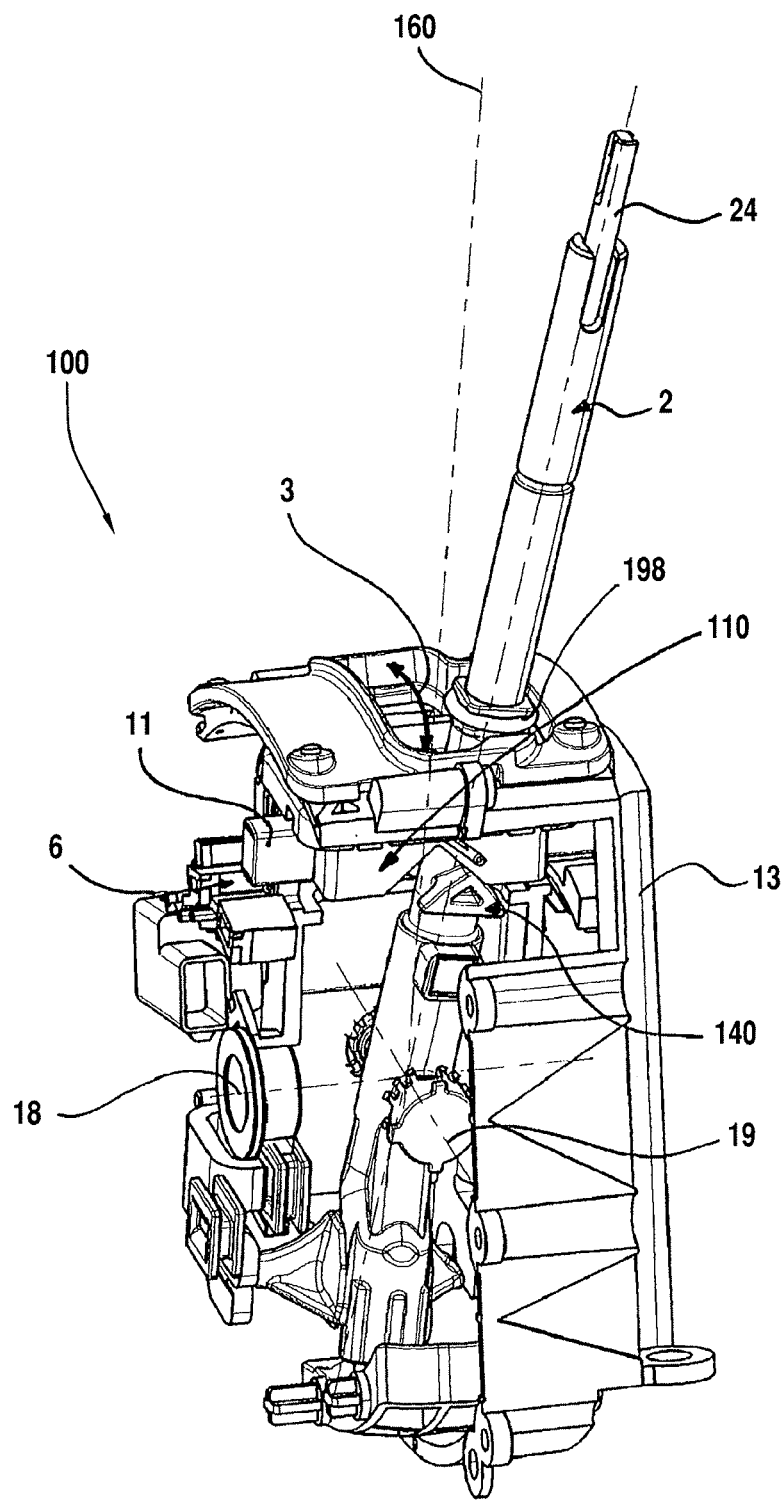
FIG. 8 is a sectional perspective view of a part of the gearshifting device, according to FIG. 7, with the selector lever in a second gearshift gate.

The FIGS. 3 to 6 show the gearshifting device 1, installed in the housing 13. The components of the gearshifting device 1 according to FIGS. 3 to 6, which are identical or functionally analogous to the components according to FIGS. 1 and 2, are provided with the same reference numerals. In this respect reference is made to the description relating to FIGS. 1 and 2. FIGS. 3 and 5 show the selector lever 2 in the first gearshift gate 3. In FIGS. 3 and 5 the selector lever 2 is in the first gearshift gate 3 and/or the automatic gearshift gate. In FIGS. 4 and 6 the selector lever 2 is in the second gearshift gate 4.

FIGS. 7 to 10 are schematic drawings of another embodiment of the inventive gearshifting device 100 for a transmission, in particular an automatic transmission. The components of the gearshifting device 100 according to FIGS. 7 to 10, which are identical or functionally analogous to the components of the gearshifting device 1 according to FIGS. 1 to 6, are provided with the same reference numerals. In this respect reference is made to the description relating to FIGS. 1 to 6.

The major distinction between the gearshifting device 100, according to FIGS. 7 to 10, and the gearshifting device 1, according to FIGS. 1 to 6, lies, inter alia, in that the selector lever 2 is mechanically coupled to a locking element 110, which executes an essentially vertical movement, in order to activate and/or deactivate the shift lock 5. Thus, the shift lock 5 is activated in that with respect to the gearshift gate 3 to be blocked the locking element 110 moves into the traversing path of the selector lever 2, as is especially evident from FIGS. 7 and 9. The shift lock 5 is deactivated in the same way in that the locking element 110 is moved out of the traversing path of the selector lever 2, as is especially evident from FIGS. 8 and 10. In this case the locking element 110 is moved preferably from the top to the bottom into the traversing path of the selector lever 2 and then is moved from the bottom to the top out of the traversing path of the selector lever 2.

In order to transform the pivot movement of the selector lever 2 into the linear movement of the locking element 110, the gearshifting device 100 provides a sliding block guide. The sliding block guide is formed by at least one essentially vertical guide face 120 of a guide member 196, which can be pivoted with the selector lever 2 about the second axis of rotation 18, and by a guide face 130 of the locking element 110 that is arranged obliquely to said guide member. Preferably the locking element 110 can be moved vertically on the guide face 120 of the guide member 196, so that a piece 140 that transfers the pivot movement of the selector lever 2 engages with the inclined guide face 130 of the locking element 110.

Figure 9:
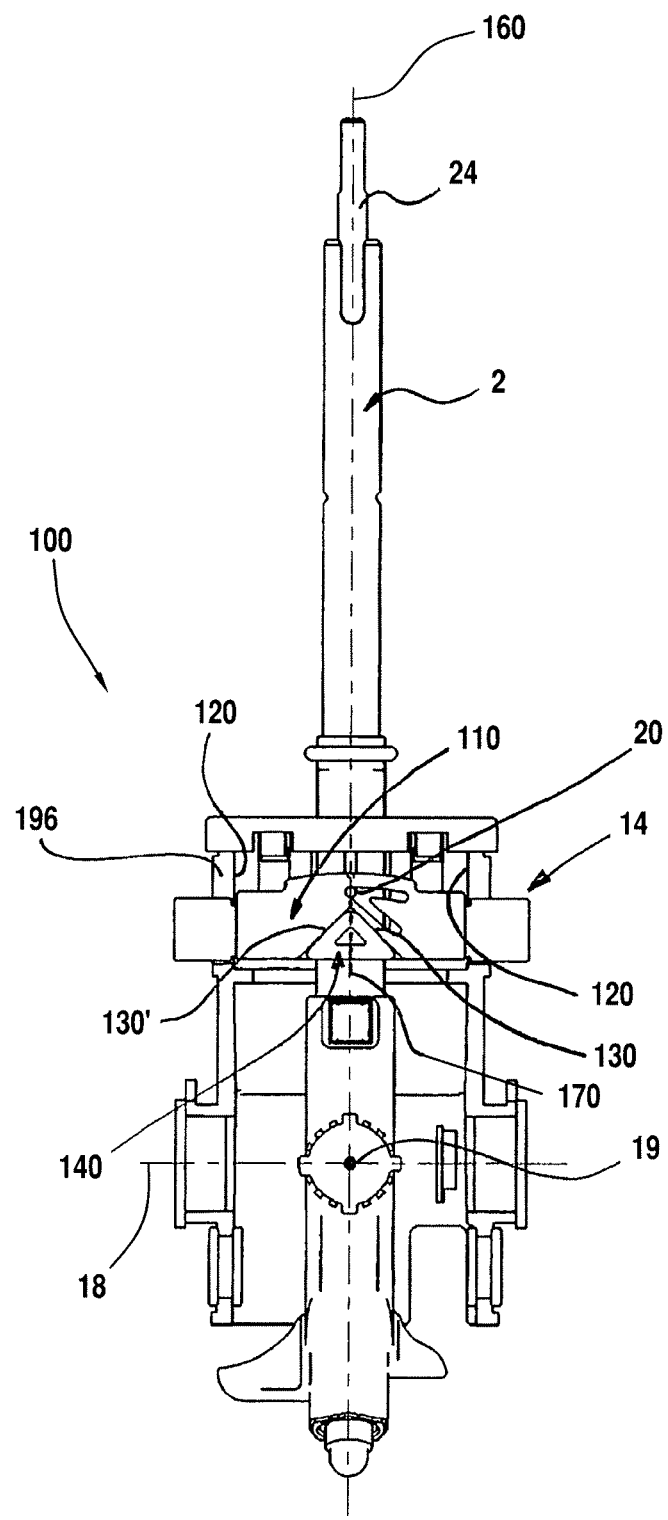
FIG. 9 is a front view of the gearshifting device, according to FIG. 7, with the selector lever in the first gearshift gate, without a housing.
Figure 10:
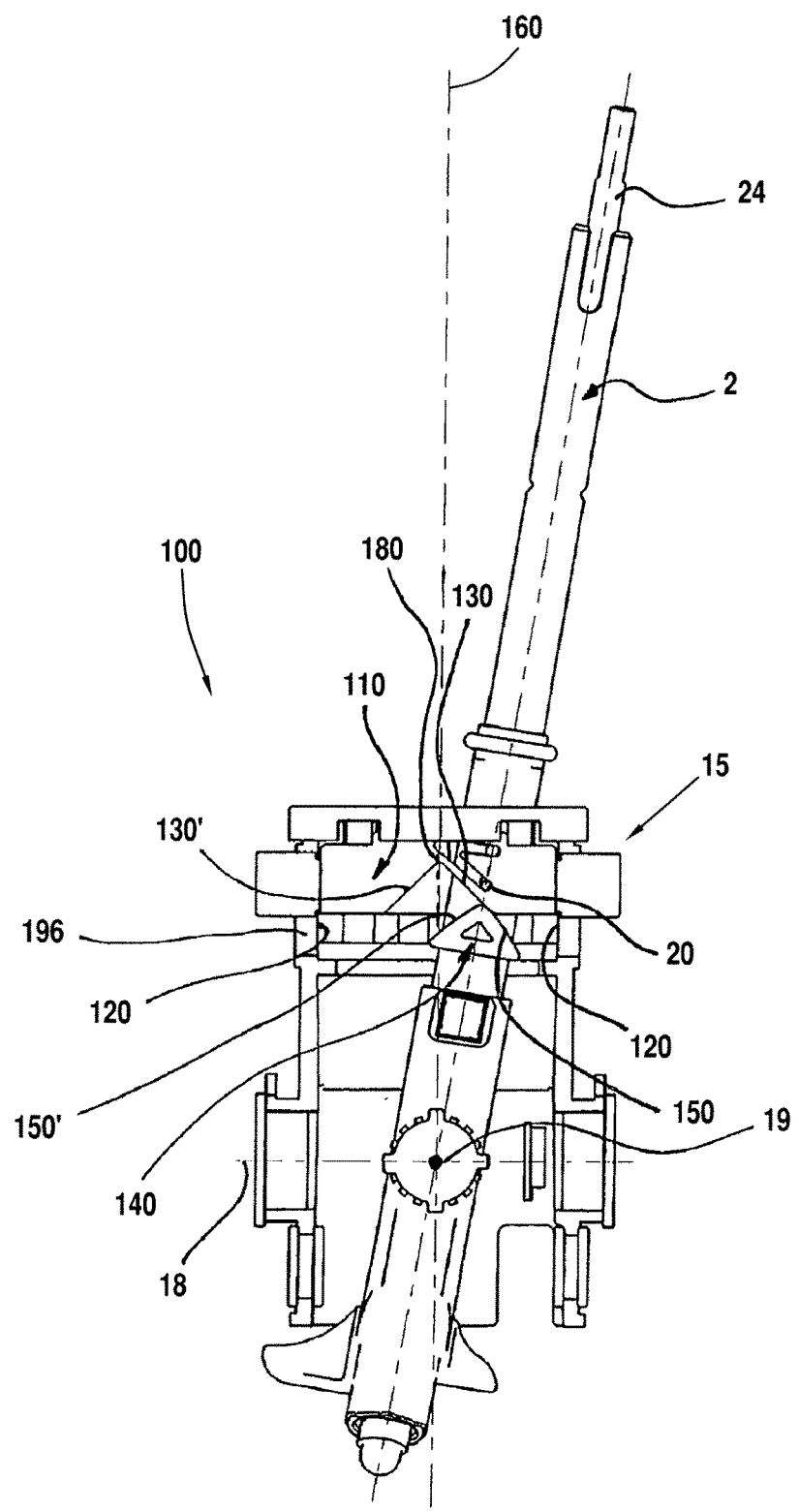
FIG. 10 is a front view of the gearshifting device, according to FIG. 8, with the selector lever in the second gearshift gate, without a housing.

It is especially clear from FIGS. 9 and 10 that the guide member 196 of the gearshifting element 100 exhibits two vertical guide faces 120, between which the locking element 110 is disposed and is guided during a vertical displacement by means of the guide faces 120.

In the case of the gearshifting device 100 the locking element 110 exhibits, besides the inclined guide face 130, additionally another inclined guide face 130'. In this case the guide faces 130 and 130' are arranged so as to be mirror-symmetrical to each other in relation to the central axis 170 of the locking element 110. As a result, the locking element 110 is suited for pivoting the selector lever 2 to the left and to the right in relation to a vertical starting position 160.

Preferably the transfer piece 140 also has two opposing surface sections 150, 150', which correspond with the inclined guide faces 130, 130' of the locking element 110 and which are arranged so as to be mirror-symmetrical to each other in relation to the central axis 180 of the transfer piece 140. Preferably the opposing surface sections 150, 150' of the transfer piece 140' are configured so as to bulge outwards.

The transfer piece 140 itself can be securely connected to the selector lever 2, a state that is achieved in the case of the gearshifting device 100, according to FIGS. 7 to 10, where the transfer piece 140 is molded or rather injection molded on the plastic enclosure for the selector lever 2.

Figure 11:
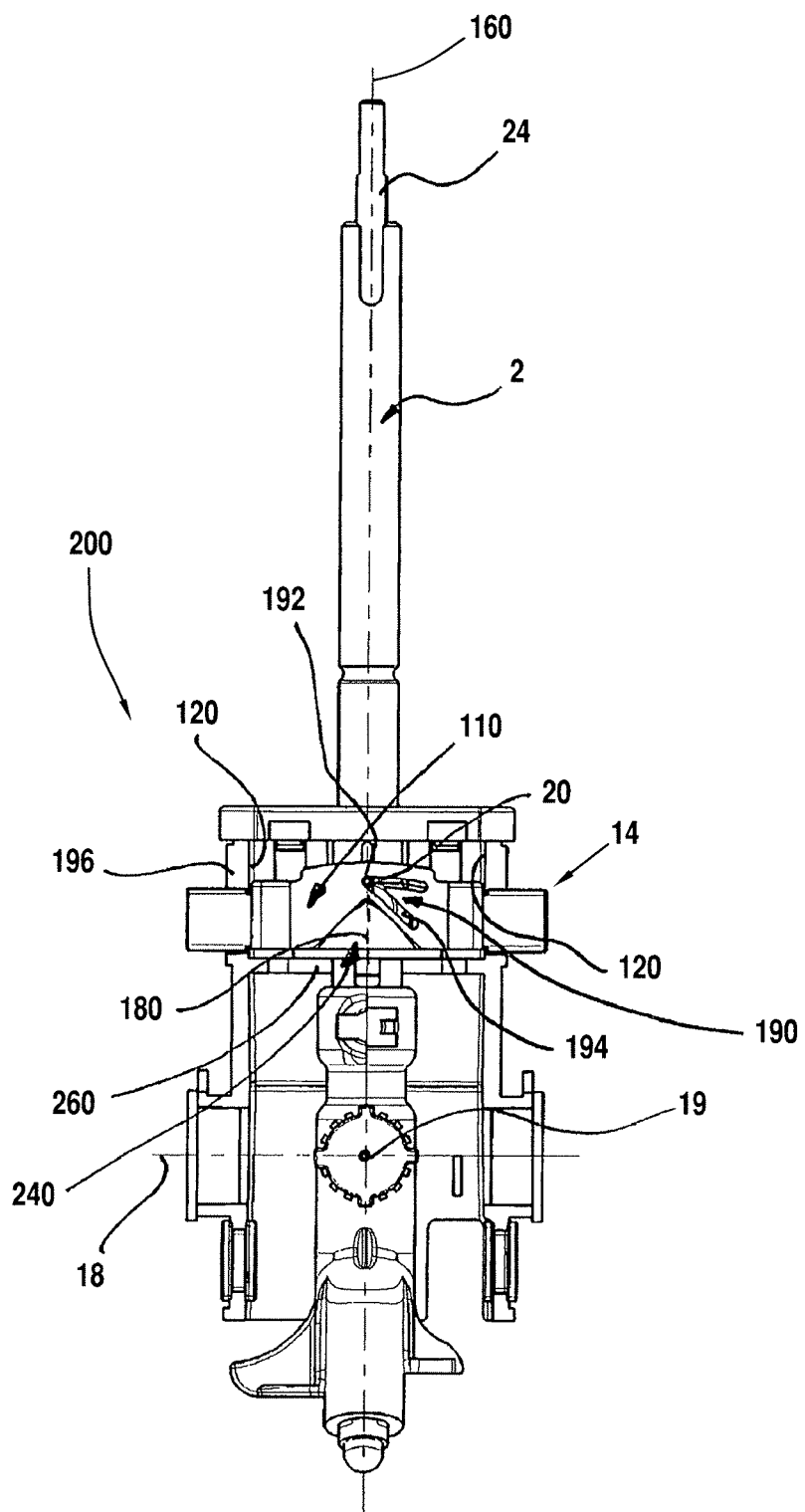
FIG. 11 is a front view of another possible embodiment of a gearshifting device for a transmission with a selector lever and in a first gearshift gate, without a housing.
Figure 12:
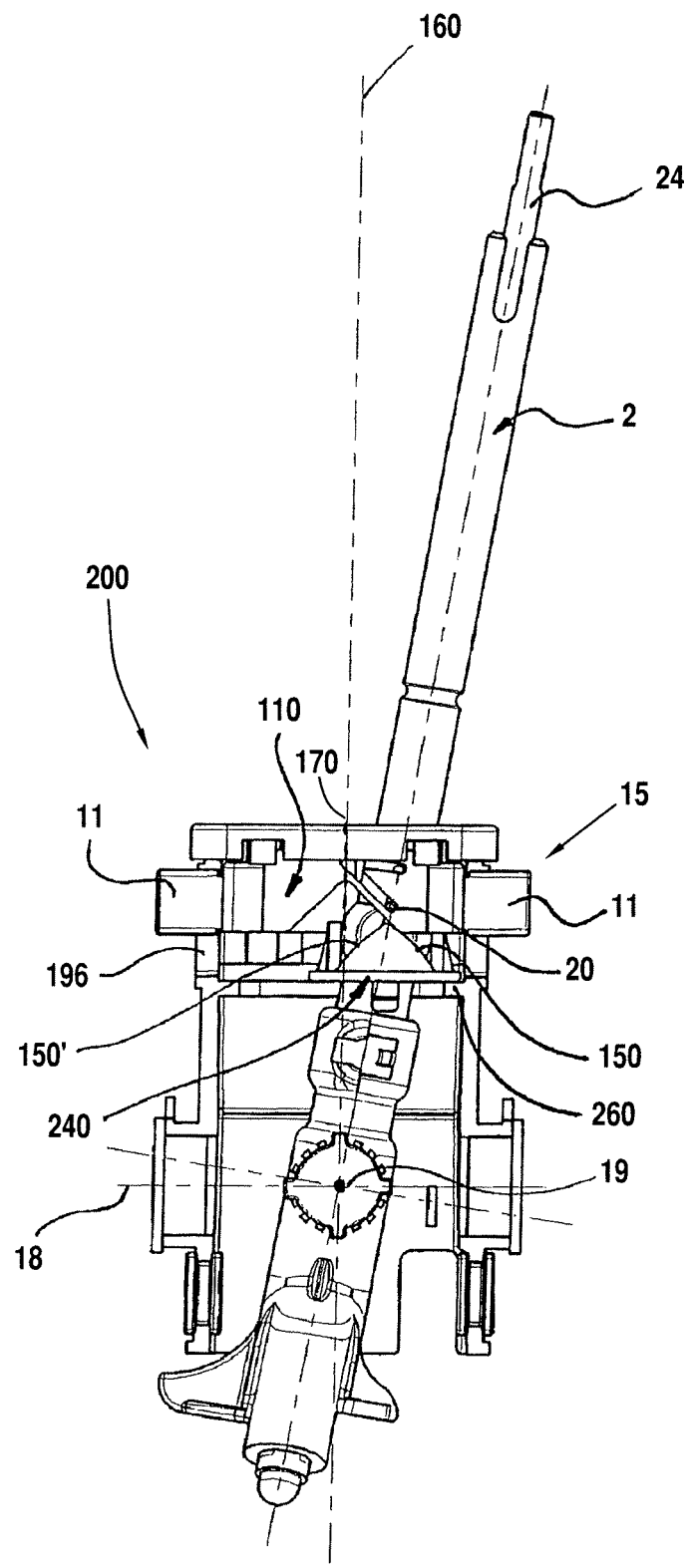
FIG. 12 is a front view of the gearshifting device, according to FIG. 11, with the selector lever in a second gearshift gate, without a housing.

FIGS. 11 and 12 show an alternative, which is an additional embodiment of a gearshifting device 200 for a transmission, in particular an automatic transmission. The components of the gearshifting device 200 according to FIGS. 11 and 12, which are identical or functionally analogous to the components of the gearshifting device 1 according to FIGS. 1 to 6, as well as the components of the gearshifting device 100 according to FIGS. 7 to 10, are provided with the same reference numerals. In this respect reference is made to the description of the gearshifting device 1 according to FIGS. 1 to 6, as well as that of the gearshifting device 100 according to FIGS. 7 to 10.

The gearshifting device 200, according to FIGS. 11 and 12, provides a transfer piece 240 that is a separate component. The transfer piece 240 can be moved horizontally in relation to a housing section 260 of the gearshifting device 200. As a result, in the course of pivoting the selector lever 2 from the first gearshift gate 3 into the second gearshift gate 4, the transfer piece 240, which is coupled to the selector lever 2 and which is guided on the housing section 250, is moved horizontally and pushes with an inclined opposing surface section 150 against the inclined guide face 130 of the locking element 110. As a result, the locking element 110 is guided along the vertical guide faces 120 so as to move vertically upwards. During the pivot movement of the selector lever 2 the transfer piece 240 remains unchanged in its rotational position, because during the pivot movement of the selector lever 2 the transfer piece 240 is moved only horizontally.

In the case of the gearshifting device 100 according to FIGS. 7 to 10 and in the case of the gearshifting device 200 according to FIGS. 11 and 12, the locking element 110 exhibits a passage opening or rather a material recess 190, in which the connecting element 20, which is coupled to the pull rod 24 of the selector lever 2, engages. The locking element 110 can be lifted up by activating the activating element (not illustrated here) by way of the pull rod 24 and the connecting element 20. At the same time the connecting element 20 makes active contact with a wall section 192 of the material recess 190. In order to avoid that the vertical movement that is executed by the locking element 110 when the shift lock 5 is deactivated does not also lift the pull rod 24 by way of the connecting element 20 and thus perhaps damage the activating element (not illustrated), the material recess exhibits an outlet area 194. On deactivating the shift lock 5 by pivoting the selector lever 2 into the second gearshift gate 4, the connecting element 20 of the pull rod 24 is moved into this outlet area 194 of the material recess 190. Inside the outlet area 194 the connecting element 20 can move freely without also lifting the pull rod 24 in the course of the lift movement of the locking element 110.

The material recess 190 can be designed in the shape of a slot—for example, in the manner of a V-shaped slot. The material recess 190 can also be designed as a triangular passage or exhibit a polygonal shape, depending on which shape can be achieved in an especially cost efficient and simple way.

While preferred embodiments of the invention have been described and illustrated here, various changes, substitutions and modifications to the described embodiments will become apparent to those of ordinary skill in the art without thereby departing from the scope and spirit of the invention.

REFERENCE NUMERALS 1 gearshifting device
2 selector lever
3 first gearshift gate
4 second gearshift gate
5, 5' shift lock
6, 6' shift lock
7, 7' shift lock
10 component, locking element
11 section
12 driving lug
13 housing
14 locking position
15 unlocking position
16 receptacle
17 passage opening, oblong hole
18 second axis of rotation
19 first axis of rotation
20 connecting element, pin
21 cross gearshift gate
22 ends
23 section
24 traction means, pull rod
25 connecting element
26 stop face
27 projection
100 gearshifting device 110 locking element
120 vertical guide face
130, 130' inclined guide face
140 transfer piece
150, 150' opposing surface section
160 vertical starting position
170 center axis
180 center axis
190 passage
192 wall section
194 outlet area
196 guide member
200 gearshifting device
240 transfer element
260 housing section
P park
R reverse
N neutral
D drive
S sport
M+ manually upshift
M− manually downshift
M manually neutral

The invention claimed is:

1. A gearshifting device (1) for a transmission, comprising:
   a selector lever (2) pivotably movable so that different shift positions (e.g., P, R, N, D, S, M+, M−) can be selected in at least a first gearshift gate (3) and a second gearshift gate (4) such that it is possible to shift between the first gearshift gate (3) and the second gearshift gate (4), wherein the first gearshift gate (3) is spaced apart from the second gearshift gate (4),
   at least one shift lock (5), for blocking a traversing path of the selector lever (2) with respect to one of the gearshift gates (3, 4) in order to shift from one of the shift positions (P, R, N, D, S) into another of the shift positions (P, R, N, D, S),
   at least one locking element (10) mechanically coupled to the selector lever (2) and by means of which the shift lock (5) can be activated and/or deactivated, in that with respect to the gearshift gate (3) that is to be blocked, the locking element (10) can be moved into or out of the traversing path of the selector lever (2); and
   a driving lug (12) defining a passage opening (17) through which the selector lever (2) extends, said passage opening (17) shaped as an oblong hole with a length longer than its width, and oriented with its length substantially perpendicular to the first gearshift gate (3) and the second gearshift gate (4), and wherein the driving lug (12) is movable axially in relation to the selector lever (2),
   wherein when the shift lock (5) is activated, the locking element (10) engages with at least one section (11) between the shift lock (5) and the driving lug (12), and
   wherein the first gearshift gate (3) is at or near a center of the passage opening (17) and the second gearshift gate (4) lies to the right or left of the first gearshift gate (3).

2. The gearshifting device as claimed in claim 1, wherein, with respect to the gearshift gate (3) that is to be blocked, the locking element (10) is upwardly movable out of the traversing path of the selector lever (2) in order to deactivate the shift lock (5).

3. The gearshifting device as claimed in claim 1, wherein the locking element (10) and the selector lever (2) are coupled mechanically together, so that when the selector lever (2) is moved between the gearshift gates (3, 4), the locking element (10) is moved alternatively into its shift lock (5) activating position (14) or into its shift lock (5) deactivating position (15).

4. The gearshifting device as claimed in claim 1, wherein the locking element (10) is liftable in the axial direction of the selector lever (2), in order to move the selector lever (2) from the one shift position (e.g., D) into another shift position (e.g., S) of the one gearshift gate (3).

5. The gearshifting device as claimed in claim 4, further comprising a connecting element (20), which is coupled to a traction mechanism (24) of the selector lever (2), for lifting the locking element (10), and said connecting element (20) extends into an opening, passage or depression or material recess of the locking element (10).

6. The gearshifting device as claimed in claim 1, wherein the locking element (10) is pivotable together with the selector lever (2) about a first axis of rotation (19) into its shift lock (5) activating position (14).

7. The gearshifting device as claimed in claim 1, wherein the driving lug (12) defines a contour, and the shift lock (5) and the contour of the driving lug (12) form a receptacle (16) for at least one section (11) of the locking element (10).

8. An automatic transmission for a motor vehicle, comprising the gearshifting device as claimed in claim 1.

9. The gearshifting device as claimed in claim 1, wherein the locking element (10) is adapted for rotation so that the second gearshift gate (4) lies to the right of the first gearshift gate (3) in a first configuration and the second gearshift gate (4) lies to the left of the first gearshift gate (3) in a second configuration after rotating the locking element (10).

10. A gearshifting device (1) for a transmission, comprising:
   a selector lever (2) pivotably movable so that different shift positions (e.g., P, R, N, D, S, M+, M−) can be selected in at least a first gearshift gate (3) and a second gearshift gate (4) such that it is possible to shift between the first gearshift gate (3) and the second gearshift gate (4), wherein the first gearshift gate (3) is spaced apart from the second gearshift gate (4);
   at least one shift lock (5), for blocking a traversing path of the selector lever (2) with respect to one of the gearshift gates (3, 4) in order to shift from one of the shift positions (P, R, N, D, S) into another of the shift positions (P, R, N, D, S), wherein one of the gearshift gates (3, 4) lies to the right or the left of the selector lever (2);
   at least one locking element (10) mechanically coupled to the selector lever (2) and by means of which the shift lock (5) can be activated and/or deactivated, in that with respect to the gearshift gate (3) that is to be blocked, the locking element (10) can be moved into or out of the traversing path of the selector lever (2); and
   a driving lug (12) defining a passage opening (17) that is an oblong hole through which the selector lever (2) extends, said passage opening (17) shaped as an oblong hole with a length longer than its width, and oriented with its length substantially perpendicular to the first gearshift gate (3) and the second gearshift gate (4), and wherein the driving lug (12) is movable axially in relation to the selector lever (2), said driving lug (12) further defining a contour, wherein the shift lock (5) and the contour of the driving lug (12) form a receptacle (16) for at least one section (11) of the locking element,
   wherein when the shift lock (5) is activated, the locking element (10) engages with at least one section (11) between the shift lock (5) and the driving lug (12), and wherein the first gearshift gate (3) is at or near a center of the passage opening (17) and the second gearshift gate (4) lies to the right or left of the first gearshift gate (3).

\* \* \* \* \*